Feb. 1, 1938.   R. E. PAGE   2,107,161
PUNCH
Filed May 9, 1936   13 Sheets-Sheet 4

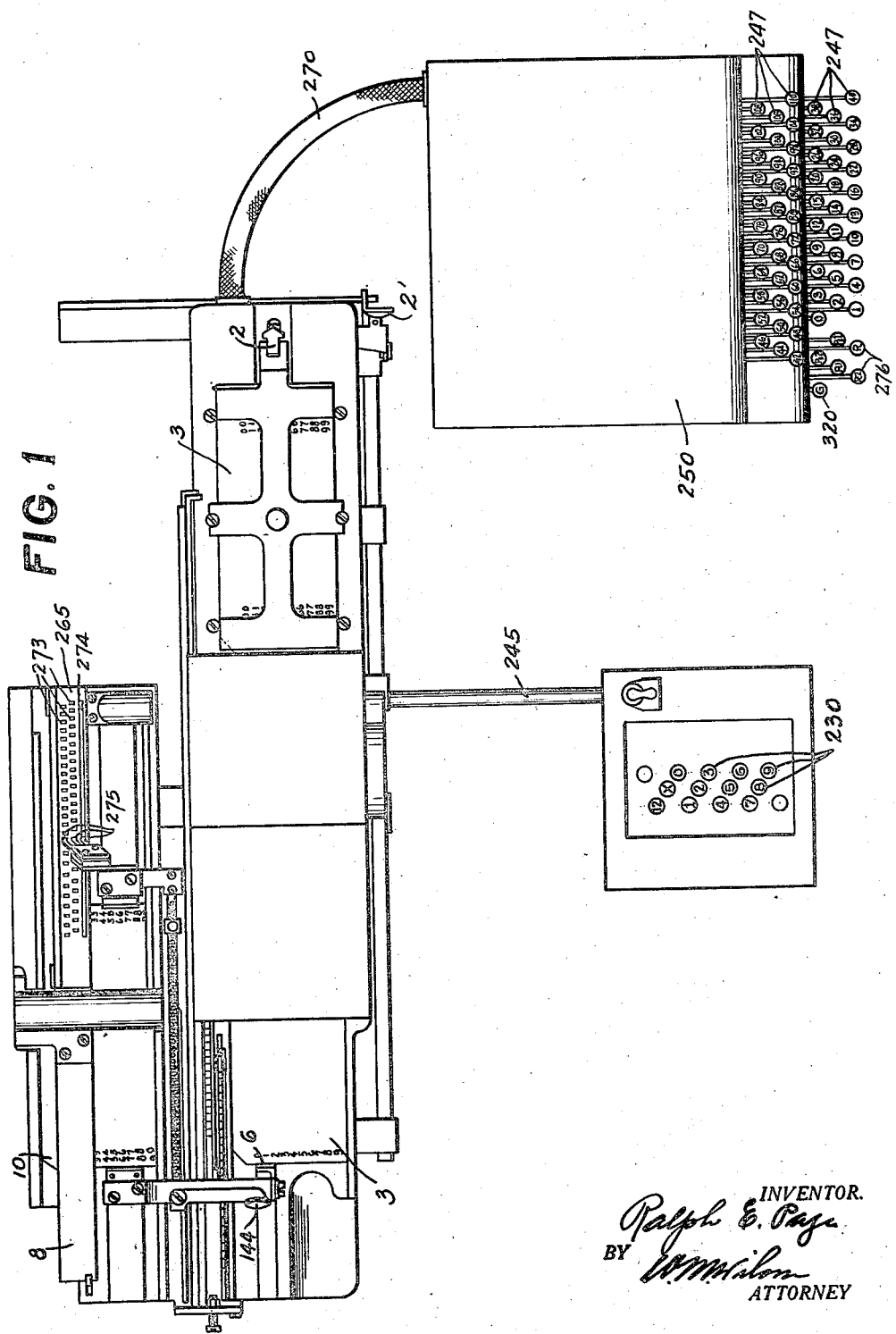

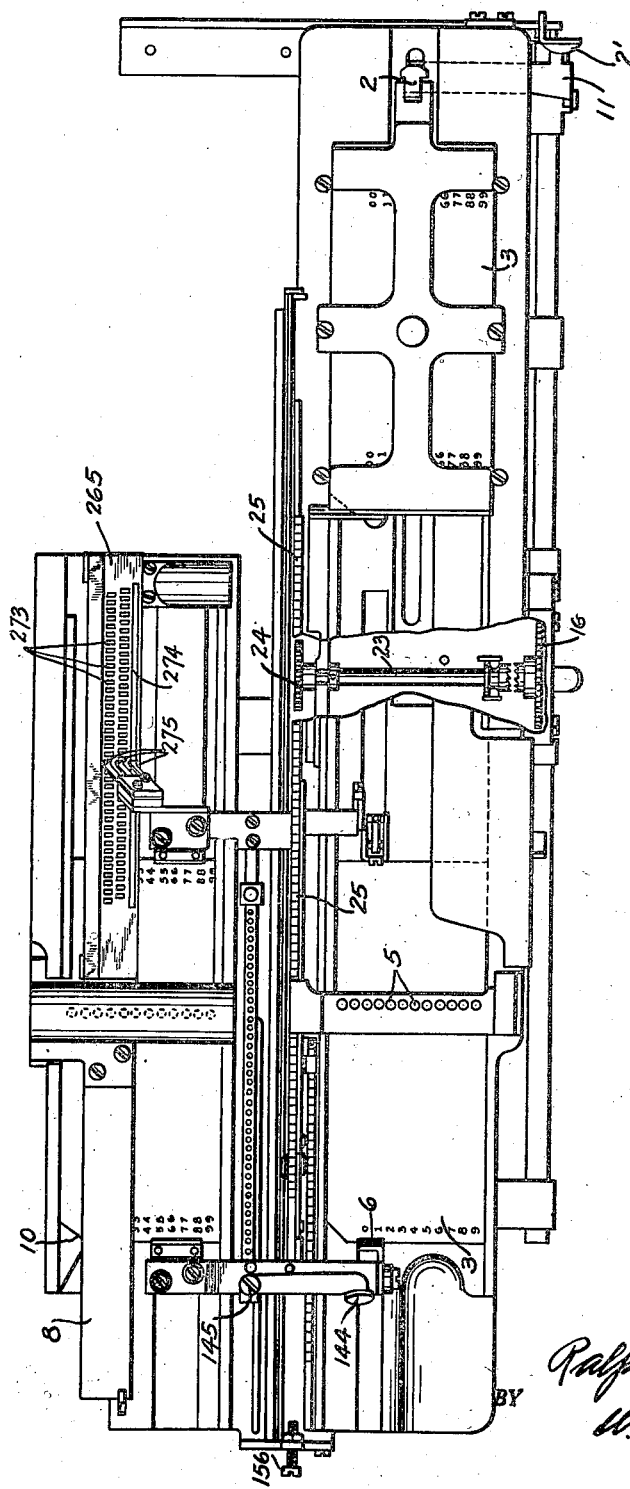

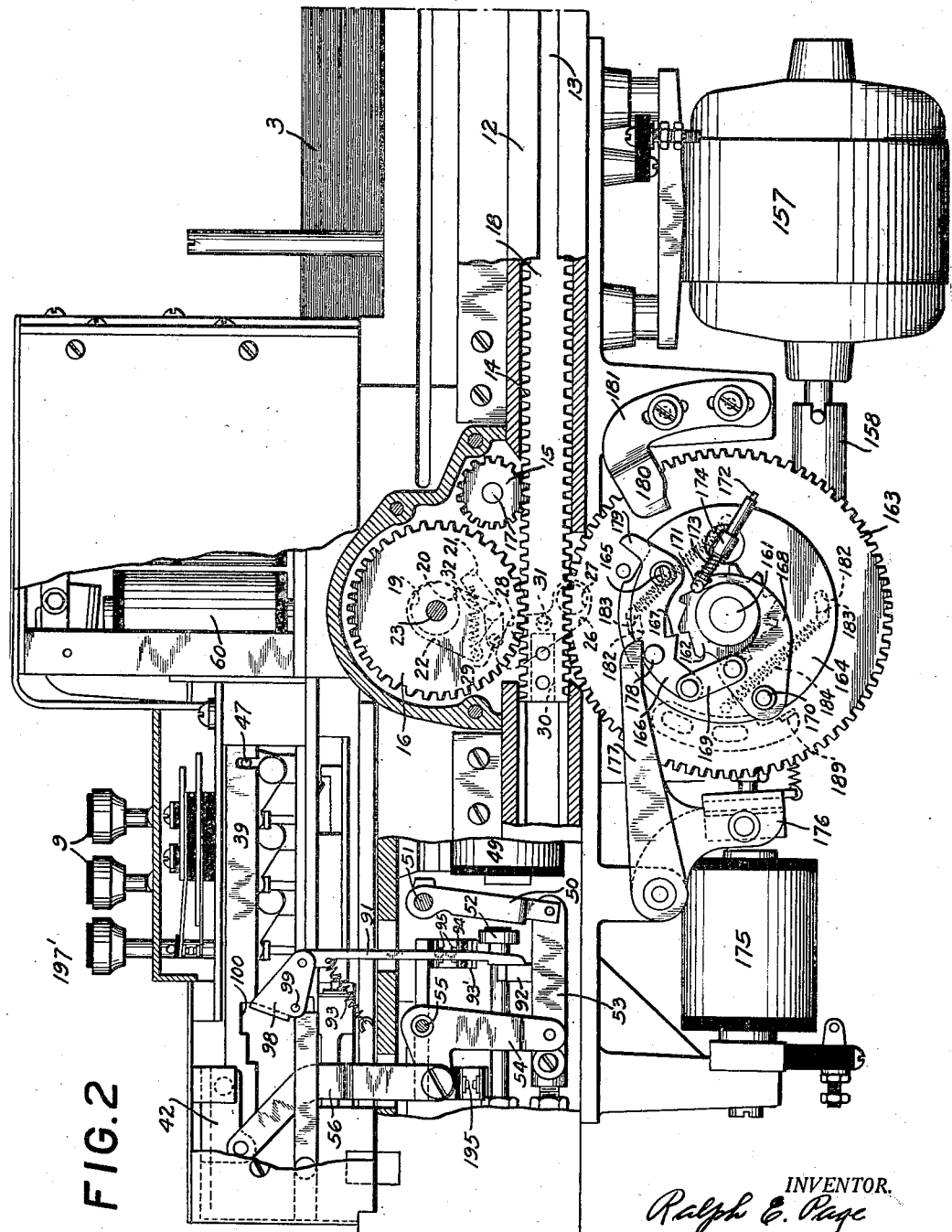

INVENTOR.
Ralph E. Page
BY
W. M. Wilson
ATTORNEY

Feb. 1, 1938.  R. E. PAGE  2,107,161
PUNCH
Filed May 9, 1936   13 Sheets-Sheet 5

INVENTOR.
Ralph E. Page
BY
ATTORNEY

Feb. 1, 1938.  R. E. PAGE  2,107,161
PUNCH
Filed May 9, 1936   13 Sheets-Sheet 6

INVENTOR.
Ralph E. Page
BY
W. M. Wilson
ATTORNEY

Feb. 1, 1938.                    R. E. PAGE                    2,107,161
                                   PUNCH
                             Filed May 9, 1936          13 Sheets-Sheet 7

Feb. 1, 1938.  R. E. PAGE  2,107,161
PUNCH
Filed May 9, 1936  13 Sheets-Sheet 8
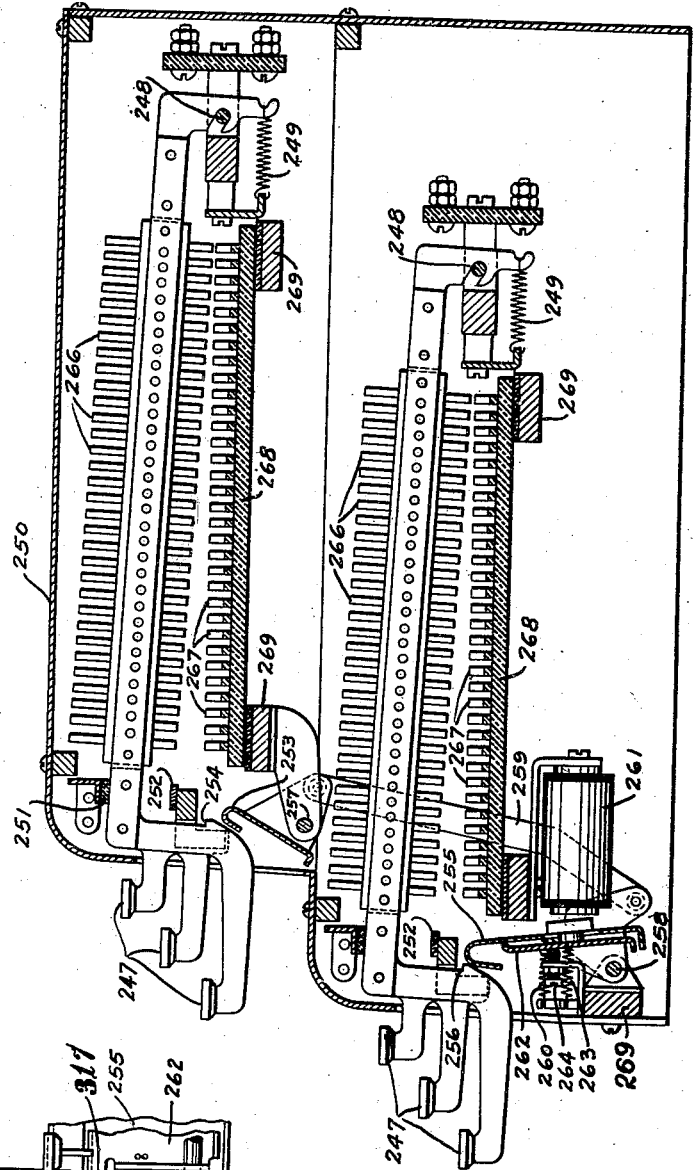
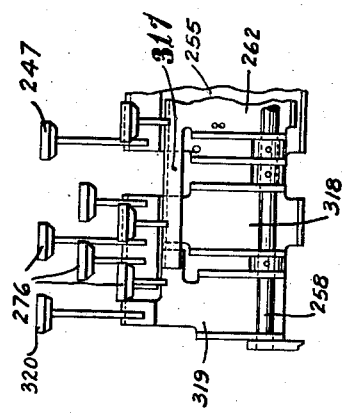
Inventor
Ralph E. Page
By
W. M. Wilson
Attorney Feb. 1, 1938.    R. E. PAGE    2,107,161
PUNCH
Filed May 9, 1936    13 Sheets-Sheet 10
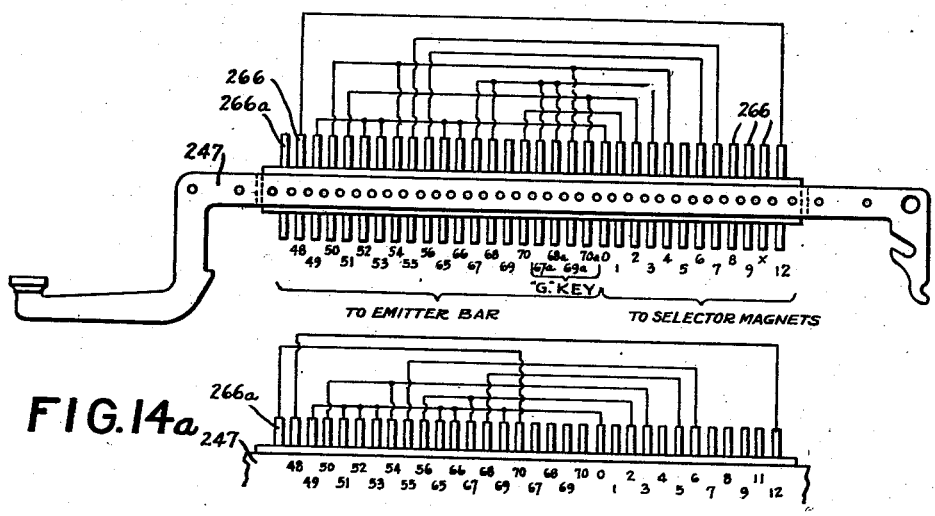
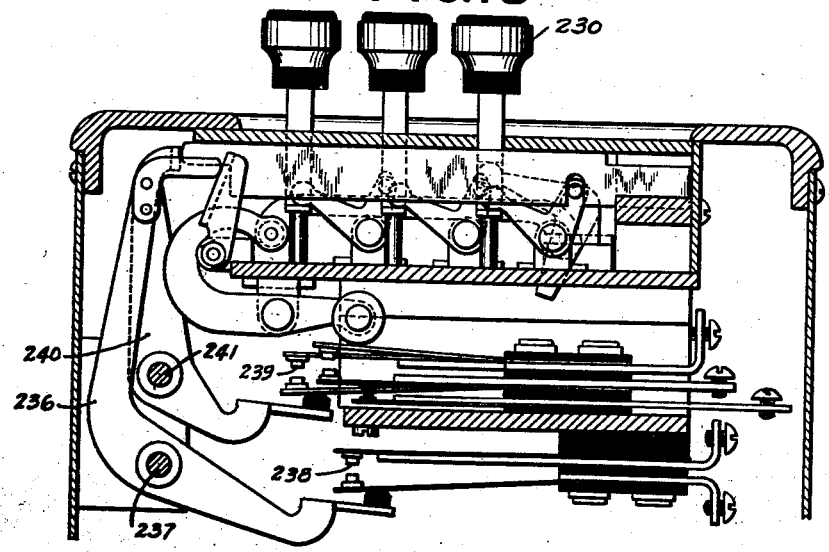

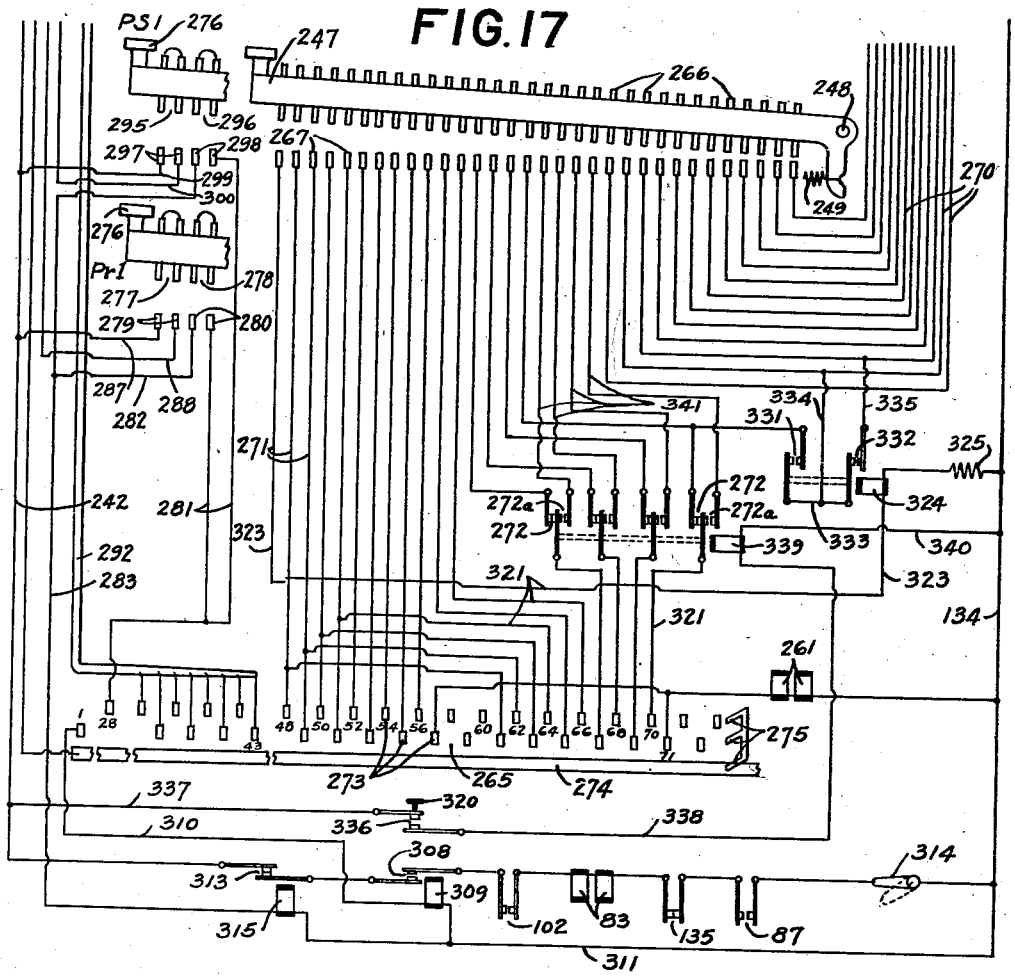

Feb. 1, 1938.  R. E. PAGE  2,107,161
PUNCH
Filed May 9, 1936  13 Sheets-Sheet 13

FIG. 18

| DIFFERENTIALS | | | ACCOUNT NUMBER | | | | | RATE | | | PREV. READINGS | | READ DATES | | NO. OF DAYS | GAS | | | ELECTRIC | | | | ARREARS | | |
|---|---|---|---|---|---|---|---|---|---|---|---|---|---|---|---|---|---|---|---|---|---|---|---|---|---|
| WATTS EXCESS LIGHT'G | NO. OF MET. | | DIST. | RI | UNIT | | HOUSE NO. | SERIAL | | | GAS | ELEC. | PREV. M/DAY | PRES. M/DAY | | PRESENT READING | C. CU. FT | AMOUNT | PRESENT READING | KW-HRS | AMOUNT | CODE | GAS | ELEC. | |

FIG. 19

| EXTEN- SION KEY | WHEN EXTENSION KEY IS DEPRESSED FOR GAS, THE FOLLOWING EXTENSION WILL BE MADE IN THE COLUMNS INDICATED | | | | | | | | | | WHEN EXTENSION KEY IS DEPRESSED FOR ELECTRIC, THE FOLLOWING EXTENSION WILL BE MADE IN THE COLUMNS INDICATED | | | | | | | | | | WHEN THE SPECIAL KEY (G) IS DEPRESSED (AFTER DEPRESSING AN EXTENSION KEY ABOVE 40) THE FOLLOWING EXTENSION WILL BE MADE IN THE COLUMNS INDICATED | | | | | | | | | |
|---|---|---|---|---|---|---|---|---|---|---|---|---|---|---|---|---|---|---|---|---|---|---|---|---|---|---|---|---|---|---|
| | 48 | 49 | 50 | 51 | 52 | 53 | 54 | 55 | 56 | 57 | 61 | 62 | 63 | 64 | 65 | 66 | 67 | 68 | 69 | 70 | 61 | 62 | 63 | 64 | 65 | 66 | 67 | 68 | 69 | 70 |
| 0 | Y | 0 | 0 | 0 | 9 | 0 | 1 | 0 | 0 | | Y | 0 | 0 | 0 | 9 | 0 | 1 | 0 | 0 | ½ | | | | | | | | | | |
| 2 | Y | 0 | 0 | 2 | 9 | 0 | 1 | 0 | 0 | | Y | 0 | 0 | 2 | 9 | 0 | 1 | 0 | 0 | ½ | | | | | | | | | | |
| 4 | Y | 0 | 0 | 4 | 9 | 0 | 1 | 0 | 0 | | Y | 0 | 0 | 4 | 9 | 0 | 1 | 0 | 0 | ½ | | | | | | | | | | |
| 6 | Y | 0 | 0 | 6 | 9 | 0 | 1 | 2 | 2 | | Y | 0 | 0 | 6 | 9 | 0 | 1 | 0 | 0 | ½ | | | | | | | | | | |
| 38 | Y | 0 | 3 | 8 | 0 | 0 | 4 | 3 | 8 | | Y | 0 | 3 | 8 | 0 | 0 | 3 | 0 | 6 | ½ | | | | | | | | | | |
| 40 | Y | 0 | 4 | 0 | 0 | 0 | 4 | 5 | 7 | | Y | 0 | 4 | 0 | 0 | 0 | 3 | 2 | 0 | ½ | | | | | | | | | | |
| 42 | Y | 0 | 4 | 2 | 0 | 0 | 4 | 7 | 6 | | Y | 0 | 4 | 2 | 0 | 0 | 3 | 3 | 2 | 1 | Y | 0 | 4 | 2 | 0 | 0 | 3 | 3 | 4 | 2 |
| 44 | Y | 0 | 4 | 4 | 0 | 0 | 4 | 9 | 5 | | Y | 0 | 4 | 4 | 0 | 0 | 3 | 4 | 4 | 1 | Y | 0 | 4 | 4 | 0 | 0 | 3 | 4 | 8 | 2 |
| 46 | Y | 0 | 4 | 6 | 0 | 0 | 5 | 1 | 4 | | Y | 0 | 4 | 6 | 0 | 0 | 3 | 5 | 6 | 1 | Y | 0 | 4 | 6 | 0 | 0 | 3 | 6 | 2 | 2 |
| 48 | Y | 0 | 4 | 8 | 0 | 0 | 5 | 3 | 3 | | Y | 0 | 4 | 8 | 0 | 0 | 3 | 6 | 8 | 1 | Y | 0 | 4 | 8 | 0 | 0 | 3 | 7 | 6 | 2 |

INVENTOR.
Ralph E. Page
BY
ATTORNEY

Patented Feb. 1, 1938

2,107,161

UNITED STATES PATENT OFFICE 2,107,161

PUNCH

Ralph E. Page, Binghamton, N. Y., assignor to International Business Machines Corporation, New York, N. Y., a corporation of New York Application May 9, 1936, Serial No. 78,748

14 Claims. (Cl. 164—113)

This invention relates to record-card punching machines and more particularly to punching machines for punching cards of the well known Hollerith type. In the tabulating machine art it is the common practice to punch cards with perforations which designate various kinds of statistical data. These cards are then utilized in sorting and tabulating machines to obtain various classified records of the data on the cards. In the use of such tabulating systems, it is sometimes necessary to duplicate certain data on large numbers of cards comprising a plurality of groups of cards. This is usually done by controlling the punching mechanism from a master card; that is, the perforations in certain columns of the master card control the punch mechanism to punch the same data in the same columns or in other selected columns of a new card. Certain data may be common to all of the cards comprising a single group, but analogous data in the same columns data may vary with each group. These data may be set on adjustable devices such, for instance, as those disclosed in U. S. Patent No. 2,016,706 issued October 8, 1935 to G. F. Daly and Gunne Lowkrantz, wherein an adjustable device is provided for each card column and the variable data for each card group may be set on the device corresponding to the column in which it is desired to punch it.

Also, there are those data which are peculiar to and vary with each individual card. These data have been punched manually heretofore by depressing a key for each column to be punched, the key depressed representing the data to be punched in that column. To punch manually data which varies for each individual card on a large number of cards consumes a great deal of time.

The broad object of the instant invention includes the provision of a device which makes it possible to control the punching of data in a plurality of columns by the operation of a single manipulative device.

Another object of this invention is to provide novel means whereby operation of a single manipulative device conditions a plurality of circuits so that plural related data may be punched in a plurality of fields.

Still another object is to provide means to control a punching machine by a single manipulative device to punch certain data in a plurality of card fields and to punch other data in other fields.

A further object is to provide means to selectively punch plural data in a given card field under the control of a single manipulative device.

With these and incidental objects in view, the invention includes certain novel features of construction and combinations of parts, the essential elements of which are set forth in the appended claims and a preferred form an embodiment of which is hereinafter described with reference to the drawings which accompany and form a part of this specification.

In said drawings:

Fig. 1 is a plan view illustrating the several devices comprising the machine.

Fig. 1a is a plan view of the card reproducing mechanism.

Fig. 2 is a view in side elevation of a portion of the punch mechanism, partly broken away to show some of the mechanism.

Fig. 10 is a sectional view through the rate key circuit selecting device.

Fig. 11 is a detail view showing the date key and rate key latching device.

Fig. 14 is a detail view of the rate key for rate 42 showing connections from the punch circuits to the columnar circuits.

Fig. 14a is a detail view of the "30" rate key showing the circuit connections.

Fig. 15 is a sectional view through the keyboard taken on line 15—15, Fig. 1.

Figure 16:
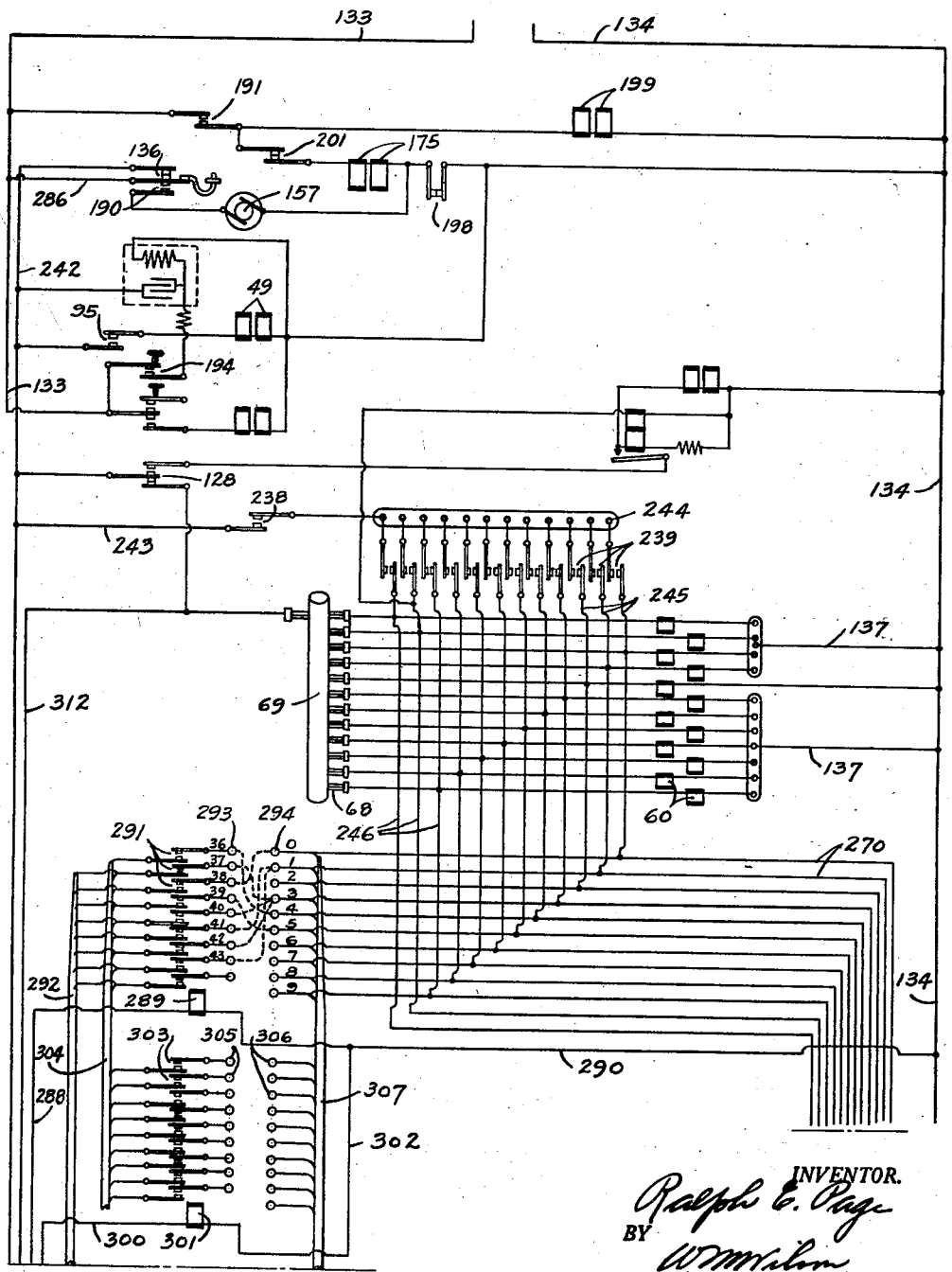

Figs. 16 and 17 constitute the circuit design.

Fig. 18 illustrates a typical card punched on the machine, and

Fig. 19 illustrates a schedule of rates.

The machine is arranged for convenient right hand operation by a finger piece or handle 2' (Fig. 1a) having a normal position at the right hand end of the machine and being mounted for leftward movement along the side of the machine.

Figure 3:
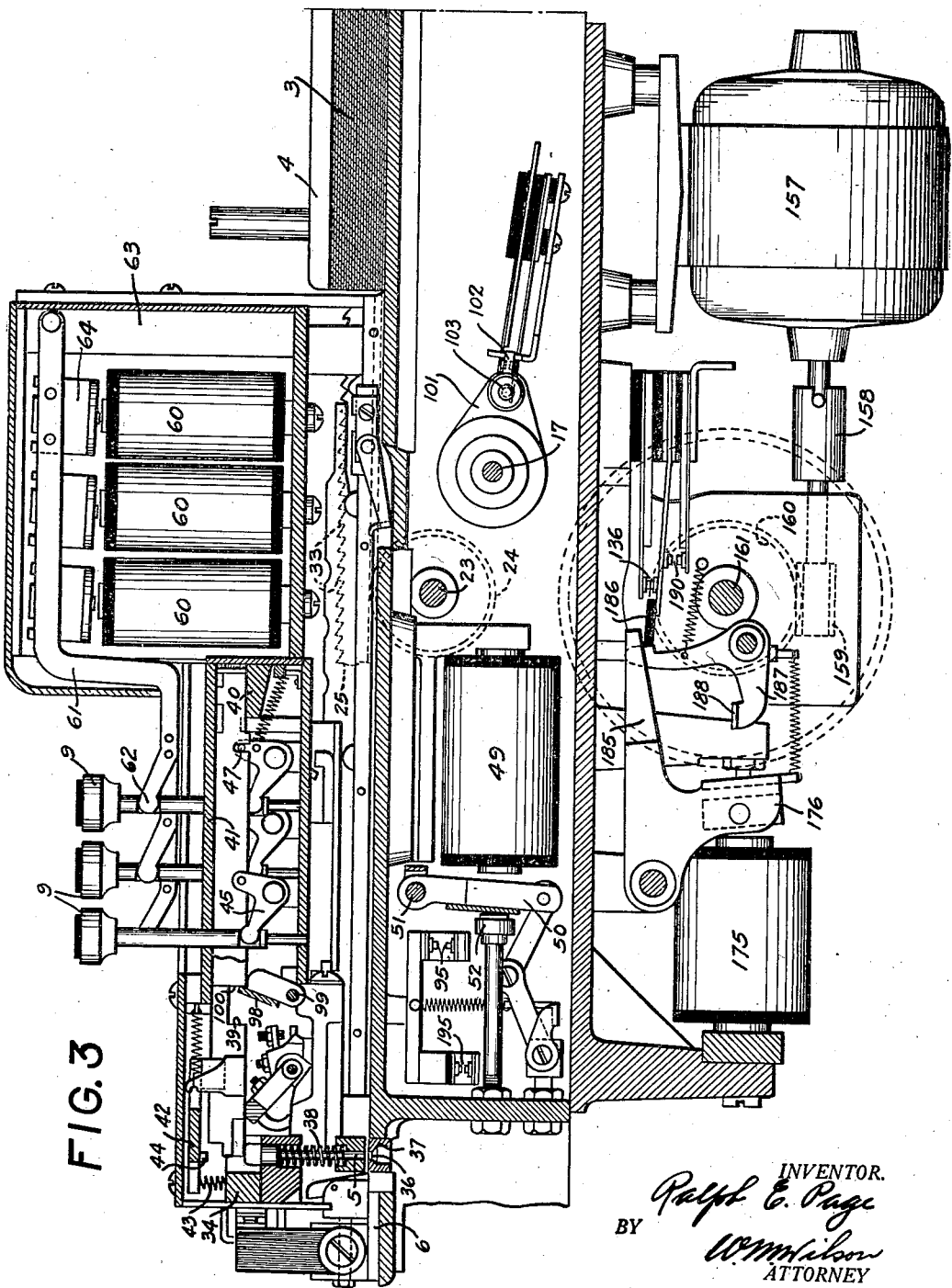
Fig. 3 is a sectional view through the punching mechanism.

When the handle is moved to the left, in this manner a statistical card 3 is fed from the bottom of the hopper 4 by the usual picker knife 2 and advanced to the left to be operated upon by the punching mechanism comprising punches 5 (Fig. 3).

Such leftward actuation of the handle 2' also serves to move a card carriage 6 (Fig. 1a) to the right to a position to receive the card 3 when the picker reaches the end of its leftward movement. The card is then punched column by column, as required, and the card carriage 6 moves step by step to the left. When the punching of the card is completed and the carriage has reached the end of its movement the punched card according to the present invention is automatically removed and the operation repeated.

The punches 5 may be operated normally by means of numeral keys 9 (Fig. 2) or may be controlled by a duplicator in accordance with the perforations of a pattern member which may be a previously punched card functioning as a master card 10 (Fig. 1a). Such master card is also supported by a carriage 8 and is moved through the duplicator concomitantly with the movement of the blank card 3 through the punching mechanism.

The punches 5 may also be operated under the control of the electrical circuits illustrated in Figs. 16-17 which circuits are set up by the keys illustrated in Figs. 10 and 12 in a manner to be described later. Also the punches may be operated by the keys shown in Fig. 15 which close circuits to the selector magnets to be fully described later.

The handle 2' is mounted at its left end on a bracket 11 (Fig. 1a) and at the right of the bracket the handle is offset to provide a finger engaging portion. Bracket 11 has a rearward extension having secured thereto a block to which is pivoted the previously mentioned picker adapted to feed cards singly from the bottom of the pack in the hopper 4.

The handle 2' may also be used to actuate the card carriage 6. To this end the bracket 11 is turned to extend through a longitudinal slot in a tube 12 (Fig. 2) and is secured to a rod 13 slidable in said tube. Adjacent the extreme leftward position of the handle 2' the tube 12 is cut away at the top to permit teeth 14 of a rack portion 18 of rod 13 to mesh with the teeth of a pinion 15 and a gear 16. The pinion 15 is secured to a shaft 17 on which is mounted the usual coil spring for returning the handle, when released, to its normal position as more fully shown and described in the patent to Lee and Phillips, #1,772,186 dated August 5, 1930. The gear 16 is suitably supported for rotation and is fixed to a member 19 having a single tooth 20 in the plane of a pawl 21 pivoted to a disk 22 attached to shaft 23. At its other end shaft 23 is provided with a gear 24 (Figs. 1a and 3) fixed thereon and meshing with a tooth in the lower edge of a rack 25 which may be considered as forming part of the card carriage 6.

To control the clutch device 20—21 provision is made of a cam 26 (Fig. 2) pivoted at 27 and having a cam face 28 cooperating with a pin 29 secured to a tail of pawl 21. The rack member 18 carries a block 30 in the plane of a pin 31 secured to cam 26 whereby the coaction of the end of block 30 with pin 26 at the extreme rightward position of finger piece 2 or carriage 6 will cause the cam edge 28 to rock the pawl 21 out of engagement with the shoulder of disk 19. In this position of the parts the carriage 6 is freely movable.

When, however, the finger piece 2' is shifted to the left, rack 18 through block 30, releases the cam 26 permitting a spring 32 to rock the pawl 21 sufficiently to pass the shoulder 20 which in the meantime has been brought to the necessary position by initial clockwise rotation of the gear 16 by the teeth 14 of the rack 18. It should be observed that a leftward movement of the handle 2' through clutch device 20—21 transmits power to move the carriage 6 to the right to receive a card 3 positioned by the picker in the punching mechanism 5.

Figure 7:
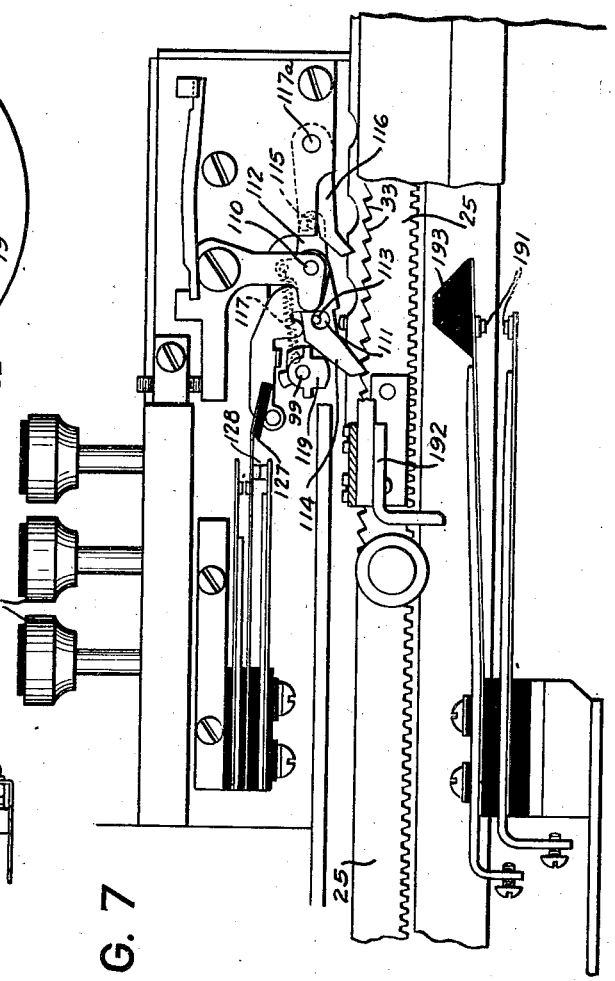
Fig. 7 is a detail view showing the carriage escapement mechanism.

The top of rack 25, observing Figs. 3 and 7, is also provided with rack teeth 33 inclining towards the left end of the machine which teeth 33 are provided for the purpose of controlling the stepping of the carriage by increments to provide for successively punching the card in the several columns. The escapement mechanism is of the same general nature as that disclosed in the Schaaff Patent No. 1,426,223, granted August 15, 1922 and reference may be had to this patent for further details of construction and operation.

It is sufficient to state at the present time that upon an initiation of the handle 2' to the left the clutch members 20, 21 are shifted into engagement thus connecting gears 16 and 24. The escapement mechanism referred to is adapted to hold the carriage 6 when it has reached its extreme limit of movement and at this time the first column of the card to be punched will lie beneath the row of the punches 5 (Fig. 3) which have enlarged upper ends guided in a member 34 and lower ends extending through openings in a guide or stripper member 35 and immediately above openings 36 in a die plate 37.

The punches 5 are of the general form disclosed in the above mentioned patent to Lee and Phillips, and are normally held in raised position by springs 38 interposed between the enlarged heads thereof and the stripper member which is provided with openings to receive the lower ends of said springs. Resting on the upper ends of said punches are interposers 39 supported at their rear ends on a cross member 40 and resting against the lower face of an overlying plate 41 so that they prevent further upward movement of said punches. The interposers 39 are so notched at their forward ends that when they are in normal position depression of an actuating plate 42 against a spring 43 will move a portion 44 of the depressor plate 42 into such notches.

However, when any numeral key 9 is depressed it will actuate a bell crank 45 against the action of suitably connected springs. The forward arm of each bell crank has a rounded head fitting into a notch in the shank of the key, the upright end having a pin 47 in a slot in the lower edge of the corresponding interposer 39. Such interposer will then be advanced to such a position that depression of the member 44 will effect depression of the interposer and consequently of the corresponding punch.

Upon movement of any of the interposers 39 a pair of contacts 95 are adapted to be closed thereby closing the circuit to a punch magnet 49 (see also Fig. 16) which through intermediate mechanism rocks the depressor 42 to actuate the selected punch 5.

Upon energization of the punch magnet 49

(Fig. 2) in this manner the armature 50 is swung about its pivot 51 away from the abutment or stop 52 and through the link 53 rocks a bell crank 54 about the pivot 55 to draw the link 56 downwardly and rock the plate or depressor 42.

Subsequently the circuit of the magnet 49 is broken allowing the return of the depressed interposer to normal position. At this time the escapement mechanism is effective and the rack 25 and card carriage advance one tooth to permit punching in the next column of the card.

Across the lower edge of all of the interposers 39 is a bail or universal member 98 pivoted at 99 and reaching into notches 100 in the interposers. Attached to the bail member 98 is a depending arm 91 the lower end of which is held against a projection 92 on the link 53 by a spring 93. This spring also urges the arm 91 downwardly rocking the bail 98 clockwise into engagement with the right hand wall of the slots 100 in the interposers 39. The arm 91 is provided with shoulder 93' normally hooked under the contact leaf 94 of the pair of contacts 95. When a key 9 is depressed moving the associated interposer 39 to operative position this interposer rocks the bail 98 counterclockwise raising the arm 91 and closing contacts 95. This causes energization of magnet 49 as will be observed in the wiring diagram (Fig. 16) to operate the perforating device. As the punch passes through the card and the link 53 moves to the right the projection 92 carries the arm 91 to the right releasing the contact leaf 94 thus opening contacts 95 and deenergizing the magnet 49. This permits the punch actuating mechanism to return to normal positions.

When the key 9 is released the interposer 39 returns and permits the bail 98 to turn clockwise to normal position lowering arm 91 so that its shoulder 93' resumes its position under the leaf 94 where it is ready to close contacts 95 when the next key is depressed. It will be recognized that when the contact leaf 94 is released contacts 95 cannot be closed again until the key 9 which effected their closing has been released and the next key depressed.

The operation of the punches 5 may also be controlled by means of the duplicator which causes the selector magnets 60 (Figs. 3 and 16) to be actuated in accordance with the perforations of a previously punched master card which in the present instance is arranged for punching in eighty different columns. The selector magnets are twelve in number and operate the ten numeral keys and two auxiliary keys, arranged to operate the two punches at the end of the row farthest from the operator.

Figure 6:
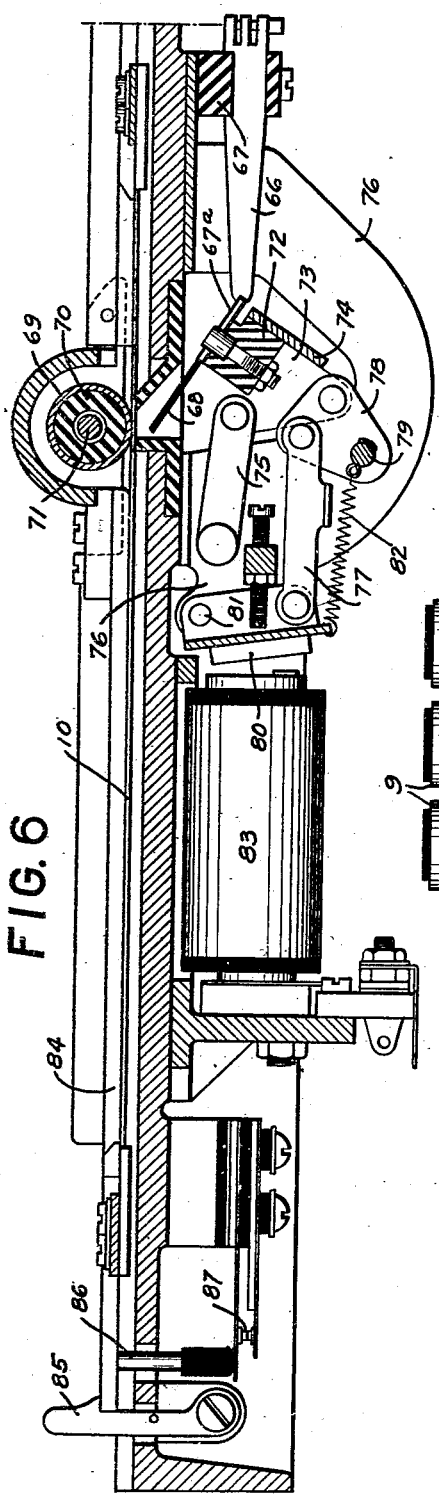
Fig. 6 is a sectional view illustrating the brush shifting and controlling device.

Such operation of the keys controlled by the selector magnets 60 may be effected by means of levers 61 (Fig. 3) having their left hand ends formed into rounded heads 62 extending into slots in the shanks of the keys to be controlled thereby and extending in the other direction substantially horizontally into a casing for the selector magnets above the cores of the magnets 60. The levers 61 are pivoted to brackets 63 spaced apart and attached to the main frame. Adjustably attached to each of the levers 61 is an armature 64 cooperating with the corresponding magnet. Extending from one end of each magnet coil 60 is a wire (not shown) which is connected to a related spring contact plate 66 (Fig. 6) the series of which are carried by a block 67 of insulating material.

Each spring 66 is adapted for a sliding continuous electrical contact with an associated brush holder 67a which carries its particular analyzing brush 68. The series of brushes 68, of which there are thirteen, are adapted to bear against a metal cylinder or roller 69 mounted on a non-conducting roller 70 which is carried by a shaft 71. The brushes 68 are carried by an insulating brush holder 72 secured between a pair of side plates 73 of a yoke or bail shaped member designated generally by reference numeral 74. Each side plate 73 of the frame 74 is supported at its upper end by a link 75 pivoted to the frame portion 76 and at their lower ends the plates 73 are supported by means of a parallel link 77. Intermediate each plate 73 and related link 77 is a toggle plate 78 pivoted upon a spring stud 79 securely fastened to the frame member 76. The end of the link 77 distant from its connecting point to the toggle plate 78 is pivotally secured to an armature structure 80, the latter being pivoted at 81 to the frame member 76. The armature 80 is attracted against the tension of a spring 82 when a magnet 83 is energized at which time the counterclockwise rocking movement of the toggle plates 78 about their pivot 79 elevates the frame 74 bringing the analyzing brushes 68 into contact with the roll 69.

The brush holder 72 and analyzing brushes 68 extend completely across the duplicator and when a master card 10 is in the duplicator it will pass between the roller 69 and all of the brushes 68 except the one to the left in Fig. 16 which is in continuous contact with the roller 69 when the latter is in lowered position.

It will be evident that when there are no perforations in the portion of the master card between the contact roller 69 and the series of brushes 68 none of the selector magnets 60 will be energized. When, however, a perforation in the master card 10 comes into position over one of the analyzing brushes 68 the circuit to one of the selector magnets 60 will be completed and by energization of the corresponding selector magnet 60 the associated punch 5 will be operated.

Associated with the master card table is a resilient plate 84 (Fig. 6) adapted to be held down by a latch 85 during normal operation. When the latch is released and the plate 84 is elevated the master card may be placed upon the master card carriage. Attached to the plate 84 is a contact operating member 86 adapted to engage and close contacts 87 when the plate is latched. Upon elevation of the latter to place a master card on the carriage contacts 87 will open and since they are in series connection with the brush magnet 83 (see Fig. 17) the latter will be deenergized to lower the brush holder 72 to its lowermost position to permit the card to be shifted on top of the master card carriage without danger of damaging or bending the brushes 68.

As a similar interference between the brushes 68 and the perforations of the master card would result as the master card is shifted to its initial punch controlling position by movement of the finger piece from the right to the left certain other mechanism is also provided to lower the brushes during this movement. This improvement forms no part of the present invention and for further details of construction and operation reference may be had to the patent in the name of F. L. Lee, No. 1,878,935, dated September 20, 1932.

For an understanding of the present machine as a whole it is sufficient to understand that secured to the shaft 17 is a plate 101 (Fig. 3) which when rocked clockwise is adapted to close a pair of contacts 102 (see also Fig. 17) through the medium of a pin 103. A suitable friction device (not shown) is interposed between shaft 17 and the plate 101, details of which are fully shown and described in the aforesaid patent to F. L. Lee. This clockwise rocking movement occurs when rack 18 is shifted to the left coincident with a corresponding movement of the finger piece during which time the master card carriage is shifted to the right. Contacts 102 are in series connection with the brush magnet 83 (see Fig. 17). When the contacts 102 are open the brushes 68 will be lowered. By a reverse movement of shaft 17 which occurs during a movement of the carriage to the left as in punching operations, shaft 17 will be rocked oppositely to cause the brushes 68 to be shifted upwardly into contact with the contact roll 69.

The escapement mechanism previously referred to is of the same general nature as that disclosed in the patent to Schaaff No. 1,426,223 granted August 15, 1922 but in order to give a better understanding of the operation of the machine a brief description of the mechanism will now be given.

Shaft 110 (Fig. 7), which is rocked as an incident to each punching or spacing operation, has secured at one end oppositely extending arms 111 and 112, of which 111 is provided with a laterally projecting pin 113 for engagement with an enlarged opening in a stepping dog 114 which is loosely pivoted. The opposite arm 112 is provided with a laterally extending pin 115 extending in a slot formed in the locking dog 116 between its pivot 117a and its engaging end.

When the shaft 110 is rocked the arm 111, through the pin 113, lifts the stepping dog 114 out of one of the notches in the rack bar 25 and at the same time the arm 112 depresses the locking dog 116 into a notch between the teeth 33.

At this time a spring 117 advances the loosely pivoted stepping dog 114 a short distance but sufficient to permit this dog to rest upon the top of the next tooth. When the locking dog 116 is again raised out of engagement with the teeth 33 at the upper edge of the rack bar 25 as an incident to the counterclockwise movement of rod 110 the stepping dog 114, due to the movement of the rack bar 25 will ride down along the tooth on which it rests until the next tooth 33 strikes the end thereof and the said carriage 6 is thereby arrested.

Figure 8:
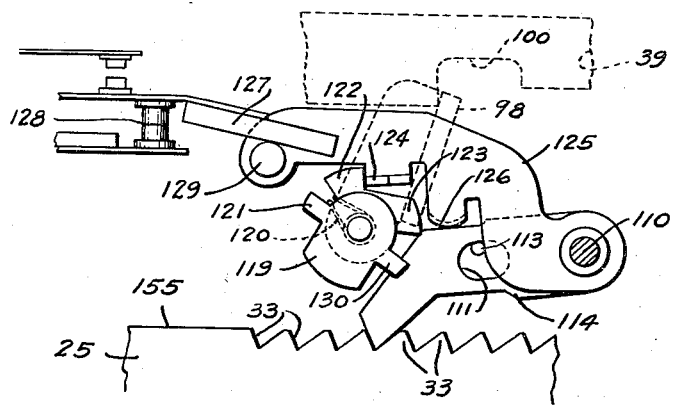
Figs. 8 and 9 are detail views of part of the carriage escapement mechanism.

As the shaft 99 upon which universal bail 98 is fixed is rocked from the position shown in Fig. 7 to the position shown in Fig. 8 by a shifting of an interposer 39, a T-shaped element 119 secured to shaft 99 is rocked slightly clockwise.

A spring 120 is coiled about shaft 99 and has its ends abutting a projection 121 of element 119 and a projection 122 of an element 123 loose on shaft 99. The projection 122 (Fig. 8) normally abuts a lug 124 of a contact operating member 125 loose on shaft 110, the result being that 119 is rocked. When the stepping dog 114 is elevated the upper edge contacting with an arcuate lug 126 of arm 125 will elevate the latter permitting the projection 122 to be urged by the spring 120 to ride under the lug 124. An insulating block 127 of the upper blade of contacts 128 contacting with a pin 129 on arm 125 will result in opening contacts 128.

The contacts 128 (see Fig. 16) are in series connection with the common brush 68 and when opened break the duplicator circuit to prevent arcing at the brushes 68.

As the universal bail 98 is returned to its normal position a projection 130 strikes a projection 131 of element 123 and rocks the latter clockwise. It will also be recalled that when the armature 50 (Fig. 2) was shifted the extension 92 disengaged the notch 93' of arm 91 from lower contact blade 94 so that when bail 98 is in the rocked position notch 93' will be positioned above the lower contact blade 94. The arcuate edge of projection 122 is of sufficient length to retain contacts 128 opened until the notch 93' re-engages the lower contact blade 94. This insures that the arm 91 will be in position to close contacts 95 by the subsequent shifting of a selected interposer prior to the closing of the duplicator circuit by closing of contacts 128.

An explanation of the parts just described will be given in connection with the preferred wiring illustrated in the wiring diagram of Figs. 16 and 17. Current is supplied to the electrical instrumentalities by line wires 133—134. Contacts 95 are in series with the punch magnet 49 so that when these contacts are closed the magnet 49 will be energized.

Energization of the magnet 83 to shift brushes 68 is dependent upon closure of four sets of contacts, contacts 87 closed when the plate 84 (Fig. 6) is latched, column cutout contacts 135 controlled in a manner hereinafter to be described, contacts 102 governed by shaft 17 which are closed when a master or blank card is shifted in a punch controlling direction and opened when the master card is positioned to its initial punch controlling position, and a set of contacts 136 which in the normal punch operations of the machine are latched closed (see also Fig. 3).

Figure 9:
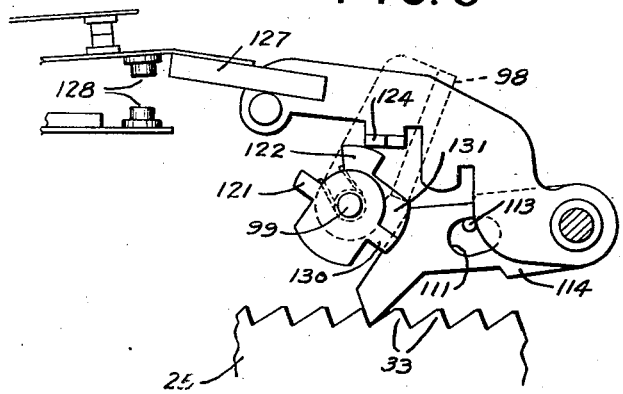

A wire 137 connects the line side 134 to one side of the series of punch controlling magnets 60 each of which is in series connection with a related brush 68 so that the circuit to roller 69 is completed through the master card perforations. One of the brushes 68 has a continuous electrical contact with roller 69 and the circuit from said brush to the line side 133 extends through the contacts 128 just described (Figs. 7, 8 and 9) and the contacts 136. The duplicator circuit is closed only when the pairs of contacts 128, and 136 are closed.

It will be recalled that when the carriage is shifted to the right to position the master card the brushes 68 are moved away from the contact roll and if it is desired to move the master card backwardly after it has passed by the analyzing brushes a lever 144 (Fig. 1a) is actuated. This lever is mounted on a pivot 145 at the left end of the carriage 6 and has a downwardly extending lug 146. When the lever 144 is actuated to move the card carriage 6 to the right the lug 146 presses against a bail 147 and rocks a shaft 148 on which the bail is mounted and inasmuch as the shaft and bail extend along the path of the movement of the card carriage the shaft 148 and bail 147 will be held in operated positions as long as the handle 144 is pressed to the right.

Projecting downwardly from the shaft 148 is a finger 149 which upon turning the shaft as described engages an insulating member 150 on a spring 151 and by flexing the spring disengages the contacts 135 thereby opening the brush magnet circuit 83. When the carriage has been positioned at the desired point the lever 144 is released, resulting in the energization of magnet 83 to elevate the brushes and closure of the duplicator circuit.

Provision is also made for cutting out the duplicator when the last column of the card has been punched. Observing Fig. 2 it will be seen that coincident with punching the last column the stepping dog 114 will rest upon the upper straight edge 155 of rack 25 thereby holding contacts 128 opened even though universal bail 98 is returned to normal. However, a second punching in the last column may also be effected by merely depressing the appropriate key 9, since the carriage is stopped by the usual column stop 156 (Fig. 1a). Several index points of the last column may be appropriated for identification purposes in order that the second perforation may identify the punch operator, a classification or the like.

Provision is also made of means for automatically returning the carriages 6 and 8 to their normal starting position by power instead of manually returning them. Such an arrangement expedites operation of the machine and requires less attention on the part of the operator. The mechanical parts for obtaining this result will now be described followed by a description of the electrical controlling instrumentalities.

Secured to the underside of the base of the machine is a motor 157 (Figs. 2 and 3) having a clutch connection to a stub shaft 158 to which is secured a worm gear 159 (Fig. 3) in mesh with a worm gear 160 secured to a shaft 161 one end of which has secured thereto a ratchet shaped clutch element 162 (see Fig. 2). Loosely mounted on shaft 161 is a gear 163 meshing with teeth on the underside of rack 18 and to which gear is secured a disk 164.

Pivoted at 165 to disk 164 is an arm 166 provided with a clutch tooth 167. The free end of arm 166 is connected to a toggle plate 168 by a link 169, the end of toggle plate 168 distant from its pivot 170 being articulated at 171 to a rod 172. The rod 172 is urged by a spring 173 and fits in an aperture in a pin 174 rotatably mounted on the disk 164. By virtue of this construction rod 172 and plate 168 act as a toggle, spring 173 acting to impositively hold tooth 167 in or out of engagement with the clutch teeth of ratchet wheel 162.

For the purpose of effecting the clutching action a magnet 175 is provided and when energized attracts an armature 176 so that an arm 177 engaging a pin 178 of arm 166 rocks the tooth 167 into engagement with ratchet wheel 162. Through link 169 the toggle connection will be moved centrifugally spring 173 acting to hold clutch tooth in engagement with the ratchet teeth. Gear 163 will thereupon be driven in a counterclockwise direction substantially a single revolution shifting rack 18 to the left just as if it was caused by movement of finger piece 2. This will, similarly, result in moving carriages 6 and 8 oppositely to their initial punch controlling position.

At the termination of the counterclockwise movement of gear 163 a tail 179 of plate 166 will strike a projection 180 of a fixed plate 181 to effect the disengagement of the tooth 167 and ratchet wheel 162 by a reverse action. The reverse action of the toggle will cause the tooth 167 to be retained out of engagement with the teeth of the ratchet wheel 162 whereupon the coil spring employed to return the handle 2', fully shown and described in Patent No. 1,772,186 will act to return the parts to normal position.

As shown and described in the patent just mentioned, a supplemental coil spring is also provided to shift the carriage intermittently under control of the escapement mechanism as an incident to each card punching operation.

Plate 164 is preferably mounted on gear 163 by pin and slot connections 182 and 183 (Fig. 2) and connected to each other for driving movement by springs 184. This construction is provided to take up the shocks due to starting from a position of rest and the sudden stopping of the rotation of gear 163.

Also secured to the pivot of armature 176 is an arm 185 (Fig. 3) the free end of which is adapted to bear upon an insulating block 186 to open contacts 136 when magnet 175 is energized. Contacts 136 are retained opened by a latching bell crank 187, a lug 188 of which is adapted to be struck by a bent up plate 189 (Fig. 2) secured to gear 163 at the termination of the driving movement of the latter. Contacts 136 as indicated in Fig. 16 are interposed in the circuit of brush magnet 83 so as to cause the lowering of brushes 68 (Fig. 6) during the power restoration of the card carriages but the circuit is closed at the termination thereof to provide for the contact of the brushes 68 with roller 69. Below contacts 136 (Fig. 3) are motor control contacts 190 which are latched closed upon an energization of magnet 175 to complete the motor circuit (see Fig. 16) and are unlatched to stop the motor at the termination of the driving operation in the manner just described.

For controlling the energization of the trip magnet 175 (Fig. 16) a pair of contacts 198 is provided. The energization of magnet 175 is therefore dependent upon closure of contacts 191 and 198. The contacts 191 are closed when the carriage is in the last columnar position. Contacts 198 (see also Fig. 6) are closed when the brushes 68 are lowered, and these contacts are opened when the brushes are raised into contact with the roll 69.

Means are provided for automatically removing a completely punched card and depositing the same in a receptacle provided for the purpose. This invention is described in detail in the patent to J. M. Cunningham, No. 1,916,965, issued July 4, 1933, to which patent recourse may be had for details of construction and operation.

Figure 4:
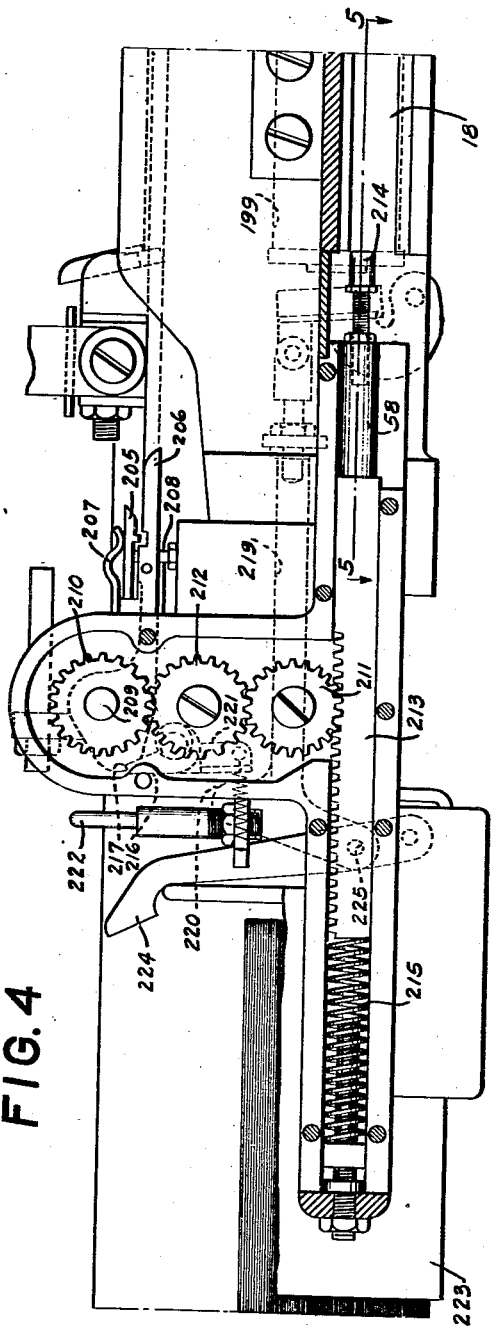
Fig. 4 is a partial elevation of the left end of the machine showing the card ejecting mechanism.

Stated generally, the gripper comprises (Fig. 4) a pair of jaws 205 and 206 urged together by a flat spring 207 but the abutment of a pin 208 with the upper jaw 205 separates the jaws in order that the punched card may be received by the slit-like separation. The card occupies a position between the jaws at the termination of the punching of the last columns in the card.

The gripper unit is pivotally mounted on a shaft 209 to which is secured a gear 210 adapted to be driven by a gear 211 by an idler gear 212. Meshing with gear 211 is a slidably mounted rack 213 the extremity of which terminates in an adjustable cylindrical plunger 214. During the previous restoration of the carriage the end of rack 18 engaged plunger 214 to shift rack 213 to the left against the tension of a spring 215. This caused a clockwise movement of shaft 209 through the train of gears 210, 211, 212 to bring the gripper unit to the position shown in Fig. 4 whereupon a latch lever 216 will engage a shoulder 217 of the lower jaw 206. At this time a certain amount of compression will be stored up in spring 215.

Shifting of latch 216 is effected by energization of the magnet 199 which attracts its armature when the magnet is energized. This causes a shifting movement of a link 219 to the right and by means of a cam shoulder 220 and arm 221 secured to the pivot shaft of latch lever 216 will shift the latter. This will result in a release of spring 215 to cause the counterclockwise rotation of the gripper unit. As the jaw 205 leaves pin 208 spring 207 will act to cause the latter to close upon the lower jaw 206 thus securely gripping the card and flipping the same in reversed position. A stationary pin 222 may suitably coact with one of the jaws to separate them permitting the released card to fall in a receptacle 223.

It is preferable, however, to suitably strip the card from the grippers and to this end a pair of strippers 224 are provided. The link 219 is pivotally connected at 225 to one of said strippers so that when magnet 199 is energized the strippers will be shifted to the right. As the jaws rotate to their flipped positions the strippers will project through suitable slots in the grippers in order that the strippers may be positioned behind the card.

Referring to the wiring diagram, the stacker magnet 199 it will be recalled is energized when by the closure of the last column contacts 191 and operation of the space key 194, or alternatively, closure of contacts 195 by depression of a second punch key 9 if switch 196 is closed.

Figure 5:
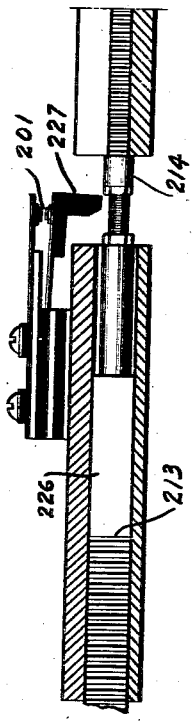
Fig. 5 is a sectional view on line 5—5, Fig. 4.

When the card just punched is removed from the carriage, shifting of rack 213 (Fig. 4) by release of spring 215 will cause a square shoulder 226 (Fig. 5) to engage a block 227 of insulating material to close contacts 201. These contacts, referring to Fig. 16, are in series connection with the clutch trip magnet 175.

Thus it will be clear that after the card has been removed from the carriage the motor restoring mechanism will be set into operation to automatically restore the card carriages without attention of the operator.

As the carriage is returned free of the punched card, contacts 191, closed at the last card column position, will now open to cause deenergization of magnet 199, the strippers 224 which have been positioned to the right of the punched card held by the grippers are now shifted by a spring connected to link 219 to strip the card from the released grippers, the latter being thereafter returned to normal latched position by the initial position of the card carriage. Figure 15 illustrates an auxiliary keyboard, which is used to operate the keys 9 (Figs. 2 and 3) and the punches by energizing the selector magnets 60. The keys 230 (Fig. 15) correspond to the keys 9. Depression of a key 230 slides a bar 231 toward the left (Fig. 15) by means of a bell crank 232. A shoulder 233 on the bar 231 rocks a bail 234 counterclockwise, which through a projection 235 of a lever 236 pivoted on a shaft 237 rocks said lever 236 also counterclockwise to close contacts 238 (see also Fig. 16). The contacts 238 are common to all of the keys 230 and are closed upon depression of any one of said keys.

Individual contacts 239, one pair being provided for each key 230, are also closed by depression of a key. There is one bar 231 for each of the keys 230 which bar is slid to the left upon depression of its associated key. Mounted on shaft 237 is a series of levers exactly like the lever 236 excepting that the projection 235 is omitted. Also a series of levers 240 is mounted on a shaft 241.

There is a lever 236 or a lever 240 for each key 230 and leftward movement of a bar 231 upon depression of its key 230 rocks the lever 236 or 240 corresponding to the depressed key counterclockwise to close the associated pair of contacts 239 (see Fig. 16). The contacts 239 closed by levers 236 do not appear in Fig. 15 since they are behind and in line with the contacts 238.

Depression of any one of the keys 230, therefore, closes the contacts 238 and the particular pair of contacts 239 associated with the depressed key. This establishes a circuit from line 133 (Fig. 16) through contacts 136, wire 242, wire 243, contacts 238, common bar 244, the particular contacts 239 closed by the action of a key, wire 245, wire 246, selector magnet 60, wire 137 to line 134. Energization of the magnet 30 functions in the manner above described to operate the corresponding key 9 and punch 5 (Fig. 3).

Figure 12:
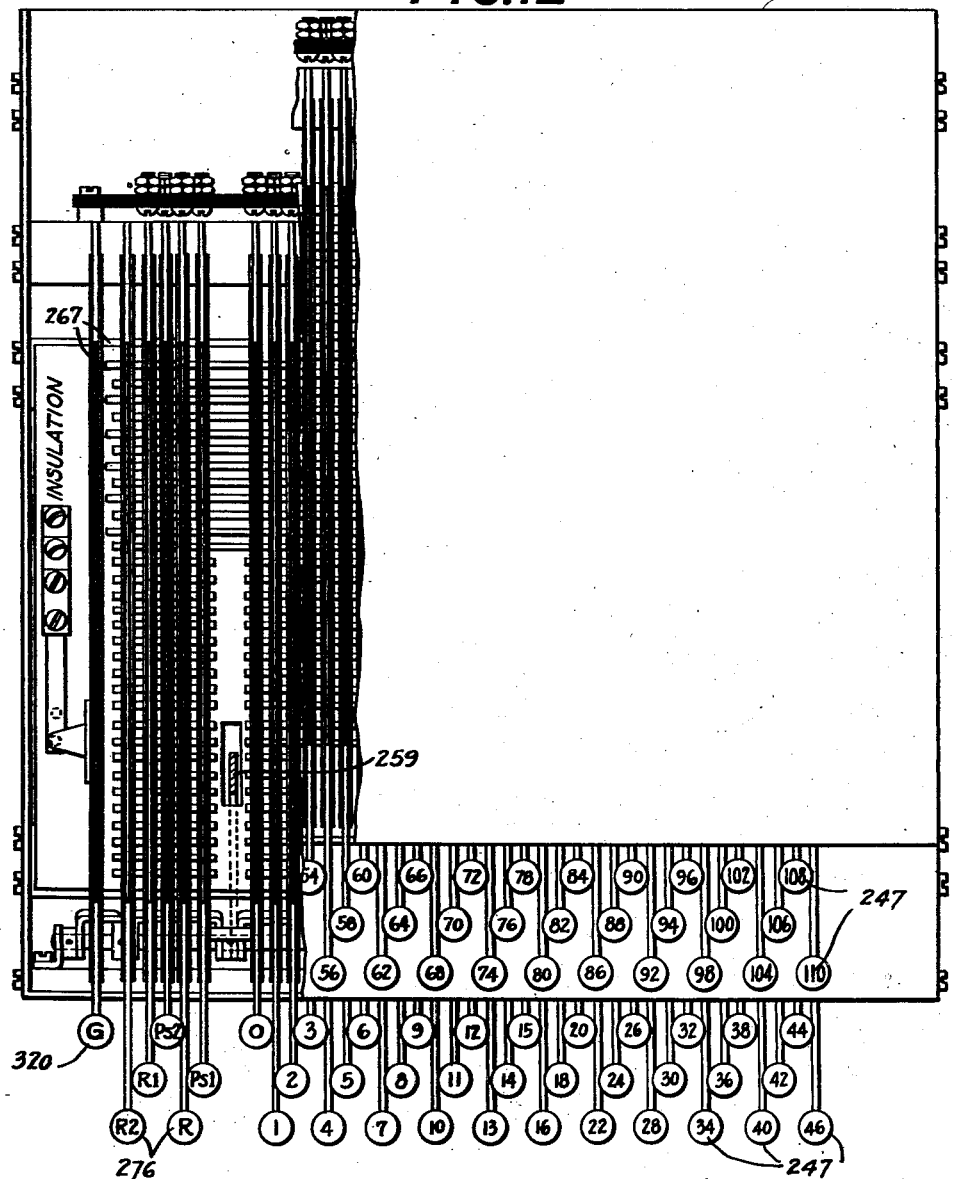
Fig. 12 is a top plan view of the rate key mechanism with a part of the casing broken away for clearness.

The keys 230 and contacts operated thereby may be located adjacent to the keyboard illustrated in Figs. 10 and 12 for convenience of operation. The latter keyboard is known as the rate extension keyboard and includes a plurality of rate extension keys 247 arranged in two tiers one above the other (see Fig. 10). The keys 247 are pivotably mounted on rods 248 suitably supported in the machine. Springs 249 normally hold the key levers in their raised positions and restore the depressed keys to raised positions when they are released in a manner to be described later.

The entire rate extension key mechanism is inclosed in a casing 250, the free ends of the keys 247 projecting through suitable openings in the casing at the left-hand side thereof. In their released position the keys normally rest against stop bars 251 extending transversely across the keys of each bank or tier. The downward movement of the keys is limited by a stop bar 252 in each bank.

When a key in the upper bank is depressed it is latched down by the action of a common latch bar 253 engaging a shoulder 254 on the key. Likewise a common latch bar 255 engages a shoulder 256 on a depressed key in the lower bank and retains the key in depressed position. The latch bar 253 is pivoted at 257 and the bar 255 is pivoted at 258. A link 259 connects the latch bars so that they move in unison.

Upon depression of a key 247 in either bank its shoulder 254 or 256 wipes by its associated latch 253 or 255 rocking said latch clockwise until the shoulder has passed a turned over projection on the latch bar, whereupon a spring 260 having one of its ends secured to the bar 255 rocks said bar counterclockwise to engage the bar with the shoulder 256 if the depressed key is in the lower bank. The other ends of the springs 260 are suitably anchored to a projection of cross bar 269. This movement is transmitted by the link 259 to the latch bar 253 to engage said bar with the shoulder 254 if a key was depressed in the upper bank.

Depression of any key 247 rocks the bars 253 and 255 thus releasing any other key in either bank erroneously depressed. The keys 247 are not otherwise manually released. Means is provided to release the depressed key automatically during the operation of the machine. This means includes a magnet 261 (Figs. 10 and 17), the armature 262 of which magnet is pivoted on the rod 258; a spring 263 normally holds the armature 262 in retracted position against a stop screw 264.

Energization of magnet 261, in a manner to be hereinafter described, rocks the armature 262 clockwise carrying the latch bar 255, and through the connecting link 259, the latch bar 253 therewith to release a key depressed either in the upper or lower bank. The springs 260 and 264 restore the latch bars 253 and 255, and the armature 262 upon de-energization of the magnet 261.

Figure 13:
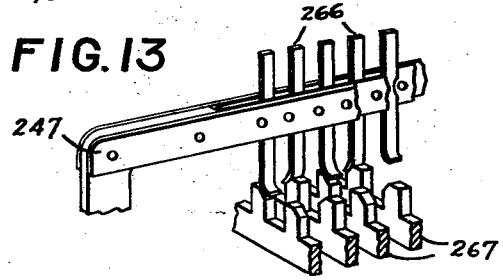
Fig. 13 is a fragmentary view of a part of one of the rate keys showing the manner in which the circuit contacts are made.

The purpose of the keys is simultaneously to make a plurality of connections from an emitter bar, illustrated generally at 265 (Fig. 17), to the selector magnets 60 (Figs. 3 and 16). To this end each of the keys 247 carries a plurality of contact members 266 adapted upon depression of a key to make electrical contact with a series of contact bars 267 mounted on dielectric plates 268 (Fig. 10) suitably supported on cross bars 269. The contact bars 267 extend beneath all of the keys and at right angles thereto, each bar being provided with a plurality of beveled projections, one for the corresponding contacts 266 on each of the associated keys, (see Fig. 13). The corresponding upper and lower bars 267 are connected together. The twelve contact bars 267 at the right (Figs. 10 and 17) are connected by wires 270 and 246 to the selector magnets 60. The remaining twenty bars 267, with the exception of the extreme left hand one, are connected either directly by wires 271 or through contacts 272 to the columnar contacts 273 of the emitter bar 265.

The emitter bar 265 (Fig. 17) is provided with a common contact bar 274 with which co-operates a brush 275. This brush is one of a set of three brushes which are electrically connected and all of which are designated by the numeral 275. The other brushes 275 co-operate with the row of contacts 273. The brushes 275 are carried by the card carriage and escape column by column therewith, successively contacting the columnar contacts 273.

Referring now to Figure 12, it may be noted that there is provided a group of five keys 276 located to the left of the rate keys 247. These keys are the date keys and serve to control circuits from the date column contacts (columns 36 to 43 inclusive—see Fig. 18) to the selector magnets 60 (Fig. 16). The keys 276 bear the legends "R," "Pr 1," "Pr 2," "Ps 1," and "Ps 2." These legends refer to the relation of the date of the previous meter reading to the date of the present meter reading. That is, if the meter was read on the same day of the previous month as the present reading the "R" key 276 is depressed. The "Pr 1" or "Pr 2" key is depressed if the previous reading was taken during the previous month one or two days in advance of the date of the present reading. Likewise, if the previous reading was made during the previous month one or two days after the corresponding date of the present reading the "Ps 1" or "Ps 2" key is depressed.

Referring to Figure 17, only two of the date keys, namely, "Pr 1" and "Ps 2" are shown, the remaining date keys being just like those illustrated. Each of the date keys 276 is provided with pairs of contacts 277 and 278, each pair being electrically connected and effective, when a key 276 is depressed, to co-operate with contacts 279 and 280 respectively.

Depression of the date key "Pr 1" closes contacts 277 and 279 setting up a circuit from line 133 (Fig. 16), wire 286, the previously described latch contacts 136, wire 242, wire 287 (Fig. 17), contacts 277 and 279, wire 288, magnet 289 (Fig. 16), wire 290 to line 134. This energizes magnet 289 which closes a series of contacts 291. These contacts are connected by a cable 292 to the columnar contacts 273 (Fig. 17) for columns 36 to 43 inclusive. The contacts 291 are also connected to columnar plug sockets 293. Another group of plug sockets 294 are connected to the selector magnets 60 (Fig. 16) by the wires 270, 245, and 246.

The date key "Ps 1" also carries pairs of contacts 295 and 296 which, upon depression of said key, make contact with contacts 297 and 298 respectively. The contacts 295 and 297, when closed set up a circuit from line 133, wire 286, contacts 136, wire 242, wire 299, contacts 295 and 297, wire 300, a magnet 301, wires 302 and 290 to line 134. Energization of the magnet 301 closes a series of contacts 303 which are connected in parallel with the contacts 291 by a cable 304 and thence by the cable 292 to the columnar contacts 273 (Fig. 17). The contacts 303 are also connected to a series of columnar plug sockets 305. Another group of plug sockets 306 are connected by a cable 307 to the corresponding sockets 294 and thence by the wires 270, 245, and 246 to the selector magnets 60.

Referring to Fig. 16 it is obvious that by plugging from sockets 293 to 294 any desired digital selector magnet 60 may be connected through contacts 291 and the cable 292 to any columnar contact 273 for columns 36 to 43, inclusive, (Fig. 17).

This is also the case with respect to the plug sockets 305 and 306. There are provided five groups of contacts and plug sockets, one for each of the five date keys 276. The contacts are connected in parallel by the cable 304 and the digital plug sockets are connected in parallel by the cable 307. Likewise, there is a magnet corresponding to each of the date keys and energized by closure of the corresponding key to select the particular group of contacts to be closed. Each group is plugged up according to the date of the previous meter reading (columns 36 to 38 inclusive), the date of the present reading (columns 39 to 41 inclusive) and the number of days between the previous and present readings (columns 42 and 43). An example of this plugging will now be given. As illustrated in Fig. 16, the plug socket 293 for column 36 is connected by a plug wire to the "4" socket 294. Column 37 socket is plugged to the "3" socket 294. Column 38 socket is plugged to the "0" socket 294. Column 39 socket is plugged to the "5" socket 294. Column 40 socket is plugged to the "3" socket 294. Column 41 is plugged to the "1" socket. Column 42 is plugged to the "3" socket and column 43 is plugged to the "1" socket 294. Thus in columns 36 to 43 inclusive will be punched 43053131. This, with reference to the card (Fig. 18), indicates that the previous reading was made on the 4th month, the 30th day. The present reading being made on the 5th month, the 31st day, and the elapsed number of days between readings was 31 days.

The rate keys 247 and the date keys 276 control the circuits from the selector magnets to certain only of the columnar emitter contacts 273. Other columns are punched manually or from a master card in the illustrated embodiment of the invention. Columns 2 to 27 inclusive are punched from the master card. Columns 28 to 35 inclusive are punched manually, columns 36 to 43 inclusive are the date columns and are punched under control of the date keys. Columns 44 to 47 inclusive are punched manually. Columns 48 to 56 inclusive are punched under the selective control of the rate keys. Column 57 energizes the rate key release magnets 261. Columns 58 to 60 are punched manually. Columns 61 to 70 are punched under the control of the rate keys. Column 71 energizes the rate key release magnet. Columns 72 to 80 are punched manually. It is to be understood, however, that the herein disclosed arrangement of the several fields of the card and the circuits for controlling the selector magnets through the emitter bar, may be varied without departing from the spirit of the invention.

When the punching is to be effected under the control of the master card, it is necessary to energize the brush magnet 83 (Figs. 6 and 17) so as to raise the brushes 68 into contact with the card in order that the perforation may be sensed as the card is carried past the brushes. At the end of such duplicate punching from a master card it is necessary to de-energize the brush magnet 83 in order that the brushes 68 may be lowered to permit manual punching or punching under the control of the date keys or rate keys. The brush magnet 83 is energized by closing brush pickup contacts 308 (Fig. 17) which is effected by energizing a brush pickup magnet 309. This magnet is energized in the following described manner:

The first column contact 273 (Fig. 17) on the emitter bar is connected by a wire 310 to the magnet 309 which is in turn connected by a wire 311 to the line 134. When the brush 275 contacts the first column contact 273 a circuit is set up from line 133, wire 286, contacts 136, wire 242, contacts 128, wire 312, common bar 274, brush 275, first column contact 273, wire 310, magnet 309, wire 311 to line 134. This energizes the brush pickup magnet 309, closing contacts 308 which sets up a circuit through the brush magnet 83. This circuit extends from line 133, wire 286, contacts 136, wire 242, brush drop contacts 313, brush pickup contacts 308, last column contacts 102 now closed, brush magnet 83, the normally closed contacts 135, door contacts 314 to line 134. This energizes the brush magnet 83 (Fig. 6) and raises the brushes 68 into contact with the master card. As the carriage now escapes column by column, the punched data are sensed by the brushes 68 (Figs. 6 and 16) energizing the corresponding selector magnets 60 which operate the punching mechanism to reproduce the data on the card 3 (Fig. 1a).

When the brushes 275 come into contact with the column 28 contact 273 a circuit is established through the brush drop magnet 315 (Fig. 17) which, becoming energized, opens contacts 313 de-energizing the brush magnet 83, whereupon the brushes 68 are lowered and the duplication stops. This circuit extends as follows: Line 133, contacts 136 (Fig. 16), wire 242, contacts 128, wire 312, common bar 274 (Fig. 17), brush 275, 28th column contact 273, wire 281, through contact 280 and 278 on the "Pr" date key or corresponding contact on the depressed date key, wires 282 and 283, brush drop magnet 315, wire 311 to line 134.

The data to be punched in columns 28 to 35 inclusive, that is, the previous reading of the meters, are read from the meter book and punched manually in these columns.

After the last manually punched column, that is, column 35, has been punched, the carriage automatically escapes to column 36, carrying with it the brush 275 which, upon contacting the 36 column contact 273 reads the data to be punched in this column through cable 292, contacts 291, the "36" plug socket 293, the plug wire between 293 and the "3" plug socket 294, wire 270, wire 246 to the "3" selector magnet 60, wire 137 to line 134. This energizes the selector magnet to punch a "3" in column 36. The remainder of the date columns 36 to 43 inclusive are similarly punched according to the plugging between 293 and 294.

When the last date column has been punched, the carriage escapes to column 44, which column together with columns 45, 46, and 47 are punched manually the operator reading the data from the meter book. After punching column 47 manually the carriage escapes to column 48. By examination of the circuit diagram, Fig. 17, it can be seen that the columnar contacts 49 to 56 inclusive represent the cubic feet of gas consumed and the amount in dollars and cents. The contact 273 for columns 48 is wired through the bar 267, contacts 266 on the rate key 247, to the "12" selector magnet (see Figs. 14 and 14a) so that a hole will be punched in the 12th position in this column. This hole is merely an indication that this field has been punched automatically under the control of a rate key.

Referring now to Fig. 14a, which illustrates the wiring for the "30" rate key, it may be seen that the contacts 266 for columns 49 to 51 inclusive are wired to the contacts 266 for the selector magnets as follows: 49 is wired to the "0" contact 266, 50 is wired to the "3" contact and 51 is wired to the "0" contact. Consequently when the "30" rate key is depressed "0" will be punched in column 49, 3 in column 50, and 0 in column 51. This represents a consumption of 30 cubic feet of gas. Contacts 266 for columns 52 to 56 inclusive are wired respectively to the "0", "0", "3", "6", and "2" selector magnet contacts, thus causing the respective columns 52 to 56 inclusive on the card to be correspondingly punched 00362 representing the amount of $3.62.

When the carriage escapes from column 56 to column 57 and the brush 275 comes into contact with the latter, a circuit is set up from line 133, wire 286, contacts 136, wire 242, contacts 128, wire 312 to the common bar 274, brush 275, column 57 contact, wire 316 (Fig. 17), rate key release magnets 261 to line 134. This energizes the magnet 261 (see also Fig. 10) and operates the previously described rate key release mechanism to release the depressed rate key and date key. In order to release the depressed date key the detent 262 (Figs. 10 and 11) carries an extension 317 projecting to the left (Fig. 11) and adapted to co-operate with a date key detent 318 and with a detent 319 associated with a special key 320 the purpose of which will be described later. The detents 318 and 319 are both mounted on the rod 258.

After the data pertaining to gas has been punched and the keys 247 and 276 released the operator depresses a rate key 247 representing the electrical data, and proceeds to punch manually the present reading of the electric meter in columns 58 to 60 inclusive. It is not necessary at this point in the operation to depress a date key since the date was punched previously in columns 36 to 43 inclusive. Assuming that the operator again depresses the "30" rate key to control the punching of the electrical data, as the carriage escapes from column 60 to column 61 the brush 275 contacts the columnar contact 273 for this column. Reference to Figure 17 discloses that the contacts 273 for columns 61, 62, 63, and 64 are connected by wires 321 to the contacts for columns 48, 49, 50, and 51 respectively. The reason for this is that in columns 48 to 51 inclusive is punched the number of cubic feet of gas consumed, and in columns 61 to 64 inclusive is punched the number of kilowatt hours of electrical power consumed.

However, since the cost per unit of gas and electricity differs, the contacts 273 for columns 65 to 69 inclusive, representing the amount in dollars and cents of electricity consumed, are wired through the "30" rate extension key 247 as follows, referring to Fig. 14a: Column 65 contact is connected to the "0" contact, column 66 contact is connected to the "0" contact, column 67 contact is connected to the "2" contact, column 68 contact is connected to the "5" contact and the column 69 contact is connected to the "0" contact.

The punch, then, operating from column 61 to 69 inclusive would punch as follows: 12th position column 61 indicating automatic punching, 0 position column 62, 3 in column 63, 0 in column 64, 0 in columns 65 and 66, 2 in column 67, 5 in column 68 and 0 in column 69. 030 in columns 62, 63, and 64 indicating the consumption of 30 kilowatt hours, and 00250 in columns 65, 66, 67, 68, and 69 indicating $2.50.

In column 70 is punched a code which indicates the classification of the electrical rate, that is, if the rate is for domestic consumption below 40 kilowatt hours the code punched in this column is 1 and 2. If for domestic consumption and above 40 kilowatt hours "1" is punched and if the rate is for commercial consumption "2" is punched in column 70. Assuming again that the "30" rate extension key is depressed, it is desired to punch 1 and 2 in the 70th column. When the carriage escapes from column 69 to column 70 the brush 275 comes into contact with the contact 273 for the latter column. This establishes a circuit from the common bar 274, brush 275, contact 273 for the 70th column, wire 321, contacts 272, wire 322, column 70, bar 267, column 70, contact 266 on the 30 rate extension key (see Fig. 14a). This contact is wired to the extreme left hand contact 266a on all rate keys from 0 to 40 inclusive. From contact 266a to the corresponding bar 267 (Fig. 17), a wire 323 to a magnet 324 and through a resistance 325 to the line 134. This circuit energizes the magnet 324 which closes contact 331 and 332 setting up a circuit from the 70 column contact 273, wire 321, contacts 272, wire 322, contacts 331, wires 333, contacts 334, and 270 to the "1" selector magnet 60. Also over contacts 332, wires 335 and 270 to the "2" selector magnet 60. Thus both the "1" and "2" selector magnets are energized to punch 1—2 in column 70.

When the carriage escapes from column 70 to 71 a circuit is made through the magnets 261, energization of which, as set forth above, releases the depressed rate extension and date keys. The data are then punched manually in columns 72 to 80 inclusive.

The rate extension keys above 40 are wired somewhat differently than those below 40. Figure 14 illustrates the wiring for the key for rate 42. It may be noted that the left hand one of the contacts on this key is not connected. The reason for this is that for rates above 40 a different code number is punched in column 70 and it is not desired to energize magnet 324 (Fig. 14). In this case, it is desired to punch "1" in column 70 and to this end the column 70 contact 266 (see Fig. 14) is wired to the "1" contact 266, so that upon the brush 275 contacting the 70 column contact 273 the "1" selector magnet 60 is energized. The circuit in this case extends from the common bar 274, wire 321, contacts 272, wire 322, 70-column bar 267, 70-column contact 266, connecting wire to "1" contact 266, "1" bar 267, the "1" wire 270 to the "1" selector magnet 60.

If a rate extension key above 40 is depressed for a commercial account the special key 320 (Figs. 11, 12, and 17) is also depressed. The purpose of this key is to control the shifting of the extension to be punched in columns 67 to 70 inclusive from those illustrated in the center group in Figure 19 to those appearing in the right hand group in this figure. This is accomplished in the following described manner:

Depression of the special key 320 (Fig. 17) closes contacts 336 establishing a circuit from line 133, wire 286, contacts 136, wire 242, wire 337, contacts 336, wire 338, magnet 339 and wire 340 to line 134. This energizes the magnet 339 opening all of the contacts 272 and closing all of the contacts 272a. Now when the brush 275 comes into contact with the columnar contact 273 for column 67 the circuit will extend from the common bar 274, brushes 275, contacts 273 for columns 67, 68, 69, and 70 successively, wires 321, contacts 272a, wires 341 to the corresponding bars 267, contacts 67a, 68a, 69a, and 70a. Reference to Fig. 14 discloses that the contact 67a is connected to the "3" contact 266, 68a to the "3" contact, 69a to the "4" contact and 70a to the "2" contact. Thus, as the brush 275 escapes successively to columns 67, 68, 69, and 70, selector magnets 3, 3, 4 and 2 will be energized causing 3342 to be punched in these columns indicating the amount of $3.34 and the code number "2".

When the carriage arrives at the last and 80th column it closes contacts 191 (Fig. 16) and automatically effects a return movement of the carriage to the first column position in the manner previously described. The operator now sets up the proper rate extension key and date key for the next card and the punch thus proceeds to duplicate the data from the master card in columns 2 to 27 inclusive.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a card perforating machine, the combination of a plurality of punches, key operated means to select the punches for operation, a plurality of columnar circuits to select the punches, a manipulative device simultaneously to select a plurality of said columnar circuits, and means successively to render the selected circuits effective.

2. In a card perforating machine, the combination of a plurality of punches, electro-magnetic means to select the punches for operation, manipulative means to select the magnets, columnar circuits to select the magnets, and a manipulative device simultaneously to select a plurality of said columnar circuits.

3. In a card perforating machine, the combination of a plurality of punches, electro-magnetic means to select the punches for operation, manipulative means to select the magnets, columnar circuits to select the magnets, a manipulative device simultaneously to select a plurality of said columnar circuits, and means successively to render the columnar circuits effective.

4. In a card perforating machine, the combination of a plurality of punches, electro-magnetic means to select the punches for operation, manipulative means to select the magnets, columnar circuits to select the magnets, a manipulative device simultaneously to select a plurality of said columnar circuits, and means to render certain of the selected columnar circuits ineffective and to select certain other columnar circuits.

5. In a punching machine, the combination of a plurality of punches, magnets to select the punches for operation, a plurality of columnar circuits to energize the magnets, means variably to connect the columnar circuits to the selector magnets, a plurality of groups of contacts in said circuits, a magnet associated with each group of contacts, and a plurality of keys selectively to energize the last mentioned magnets to operate the associated group of contacts.

6. In a card punching machine, the combination of a plurality of punches, magnets to select the punches for operation, columnar circuits to energize the magnets, means variably to connect the columnar circuits to the selector magnets, a plurality of groups of contacts in said circuits, a magnet associated with each of said groups of contacts, a plurality of keys selectively to control the energization of the last mentioned magnets, and means successively to render the circuits effective.

7. In a card punching machine, the combination of a plurality of punches, magnets to select the punches for operation, a plurality of columnar circuits to select the magnets, and a manipulative device simultaneously to select a plurality of predetermined columnar circuits.

8. In a card perforating machine, the combination of a plurality of punches to perforate column by column in a plurality of columns, electromagnetic means to select the punches, a plurality of columnar circuits to energize the electromagnetic means, means controlled by a pattern card to render the circuits for certain columns effective, means to sense the pattern card, a manipulative device simultaneously to select a plurality of the columnar circuits, and means controlled by the manipulative device to control the effectiveness of the sensing means.

9. In a card perforating machine, the combination of a plurality of punches, electro-magnetic means to select the punches for operation, manipulative means to select the magnets, columnar circuits to select the magnets, a manipulative device simultaneously to select a plurality of said columnar circuits, and manipulative means to render certain of the selected columnar circuits ineffective and to render certain other columnar circuits effective.

10. In a card punching machine, the combination of a plurality of punches, magnets to select the punches for operation, a plurality of electrical circuits to select the magnets, means simultaneously to select a plurality of said circuits and means to change the selection of certain of the circuits.

11. In a card perforating machine, the combination of a plurality of punches, magnets to select the punches for operation, a plurality of electrical circuits to select the magnets, means simultaneously to select a plurality of said circuits, means to change the selection of certain of the circuits, and means successively to render the circuits effective.

12. In a card perforating machine, the combination of a plurality of punches, selector magnets for said punches, a series of columnar contacts, a series of columnar selector circuits, and a manipulative device in said circuits intermediate the magnets and the contacts simultaneously to connect a plurality of the magnets to predetermined columnar contacts.

13. In a card perforating machine, the combination of a plurality of punches, selector magnets for said punches, a series of columnar contacts, a series of columnar selector circuits connecting said magnets to said contacts, a manipulative device in the circuits simultaneously to connect a plurality of said magnets to predetermined ones of the columnar contacts, and means successively to render said columnar circuits effective to energize the magnets.

14. In a card perforating machine, the combination of a plurality of punches, magnets to select the punches for operation, columnar circuits to energize the magnets, a pattern card, means to sense the pattern card, a manipulative device simultaneously to select a plurality of the columnar circuits, and other manipulative means to control the effectiveness of the sensing means.

RALPH E. PAGE.